United States Patent [19]

Mehaffey et al.

[11] 4,028,498
[45] June 7, 1977

[54] PRIVATE AUTOMATIC BRANCH EXCHANGE SYSTEM AND APPARATUS

[75] Inventors: Joseph H. Mehaffey, Atlanta; Edgar C. Mills, Marietta; J. Harold Ivester, Smyrna, all of Ga.

[73] Assignee: Solid State Systems, Inc., Marietta, Ga.

[22] Filed: Oct. 7, 1974

[21] Appl. No.: 512,675

[52] U.S. Cl. .................. 179/18 GE; 179/18 AA; 179/18 AD; 179/84 A
[51] Int. Cl.² .......................................... H04Q 3/42
[58] Field of Search ............. 179/18 AD, 99, 18 J, 179/18 GE, 18 GF, 18 FF, 18 FG, 18 AA, 84 A

[56] References Cited
UNITED STATES PATENTS

| | | | |
|---|---|---|---|
| 3,542,958 | 11/1970 | Brightman | 179/18 GF |
| 3,604,857 | 9/1971 | Opferman | 179/99 |
| 3,621,147 | 11/1971 | Perucca | 179/18 GE |
| 3,646,277 | 2/1972 | Gueldenpfennig et al. | 179/18 J |
| 3,743,789 | 7/1973 | Krupp | 179/15 BY |
| 3,766,325 | 10/1973 | Hatfield et al. | 179/84 A |
| 3,793,487 | 2/1974 | Kilby | 179/6 R |
| 3,825,690 | 7/1974 | Kelly et al. | 179/15 AT |
| 3,832,495 | 8/1974 | Hovagimyan et al. | 179/18 GF |
| 3,838,226 | 9/1974 | Warman et al. | 179/18 J |
| 3,859,463 | 1/1975 | Curtis | 179/6 R |
| 3,859,467 | 1/1975 | Borgström et al. | 170/15 BY |
| 3,870,826 | 3/1975 | Carbrey et al. | 179/15 BY |
| 3,903,374 | 9/1975 | Pommerening | 179/18 GF |
| 3,914,539 | 10/1975 | Hashimoto | 179/6 R X |

*Primary Examiner*—Thomas W. Brown

[57] ABSTRACT

A private automatic branch telephone exchange system which includes an integral system for maintaining and updating selected data information. Interconnections between subscriber lines and trunk lines are accomplished with a unique non-blocking switching matrix which allows switching interconnections to be independently made and terminated without blocking subsequent interconnections on the same circuits. Various information signal functions, such as dial tone and ring-back, are selected by multiplex circuitry which is external of the switching matrix, so that all switching matrix trunks are available for voice and ring signal connections. The switching matrix is operated by a circuitry including a programmed digital computer, and provides substantial flexibility of control and service functions. Subscriber line status is monitored at all times, so that available special services can be accomplished by a subscriber in response to dialing selected digits. A novel coupler circuit is disclosed for interconnecting the present or another branch exchange system to central office lines. Subscriber dialing of a predetermined non-interconnect code allows a subscriber to dial updating input data directly to a memory storage means.

15 Claims, 8 Drawing Figures

PRIVATE AUTOMATIC BRANCH EXCHANGE SYSTEM AND APPARATUS

This invention relates in general to information switching systems and in particular to a private branch telephone exchange system.

Although many changes have been made in the design and operation of private branch exchange equipment since the cord-type exchange which required an operator to physically plug and unplug cords when making or breaking each subscriber interconnection, prior art PABX equipment generally has physical and operational fixed characteristics which predetermine the operational flexibility of such equipment and which, therefore, may be less than satisfactory for many types of applications. PABX equipment may be used in applications such as hotel/motels and business offices, for example, where it is frequently desired to provide capabilities such as automatic conference calling, hold, call forwarding, and the like without resorting either to the use of multiple-button subscriber sets or special-purpose non-blocking trunks reserved only for multiple-party conference interconnection. Interconnect switching with prior-art PABX equipment generally utilizes some form of electromechanical crossbar switch, which is understood by those skilled in the art to block subsequent connection to a trunk circuit which already has an established interconnection. Other limitations in prior-art PABX equipment include the limitations inherent in hard-wired equipment, wherein changes in such operational features as class-of-service for subscribers, or automatic call rerouting, must typically be made by physically rewiring certain electrical connections within the switching system.

Another problem which is particularly prevalent in the hotel/motel industry is the need for some type of room status system which provides hotel management with continuously-updated information on the status of each room, i.e., whether the rooms are occupied, being cleaned, available for letting, and the like. An ideal room status system would have an input terminal available in each individual room, so that maids and supervisory personnel could, upon completion of cleaning or other tasks for a particular room, input data directly into a status management system. The hardware requirements and the special wiring costs associated with such a system are clearly prohibitive. The present system allows the existing conventional subscriber telephone set and wiring already associated with each room to be used in a simple manner to provide data which continuously updates a room status listing.

Accordingly, it is an object of the present invention to provide an improved private branch exchange switching system.

It is another object of the present invention to provide a programmable private branch exchange system.

It is still another object of the present invention to provide a private branch telephone exchange switching system which includes data management capabilities.

It is yet another object of the present invention to provide an improved switching matrix.

It is still another object of the present invention to provide an improved coupler apparatus for interconnection between a private branch exchange and telephone company central office equipment.

It is a further object of the present invention to provide improved apparatus for applying various noise signals to selected trunk circuits.

Other objects and advantages of the present invention will become more readily apparent from the following description of the disclosed embodiment, including the figures wherein:

Stated in general terms, switching interconnection is accomplished in the present invention through a switching matrix having a plural number of subscriber lines, a plural number of trunk lines, and switching means for selectively establishing circuit interconnection between any subscriber line and any trunk line without blocking possible interconnection to the selected trunk of any other available subscriber line. Each such selective interconnection in the switching matrix is accomplished by a coded signal applied to addressable latch means associated with the switching matrix. Address signals to the switching matrix may be provided from a programmed digital computer in response to interconnections which are predetermined by desired function information, variable input data, and subscriber input information. The programmed logic is also programmed to recognize and to store subscriber input information corresponding to a non-interconnect data input signal, and to display such non-interconnect data.

Figure 1:
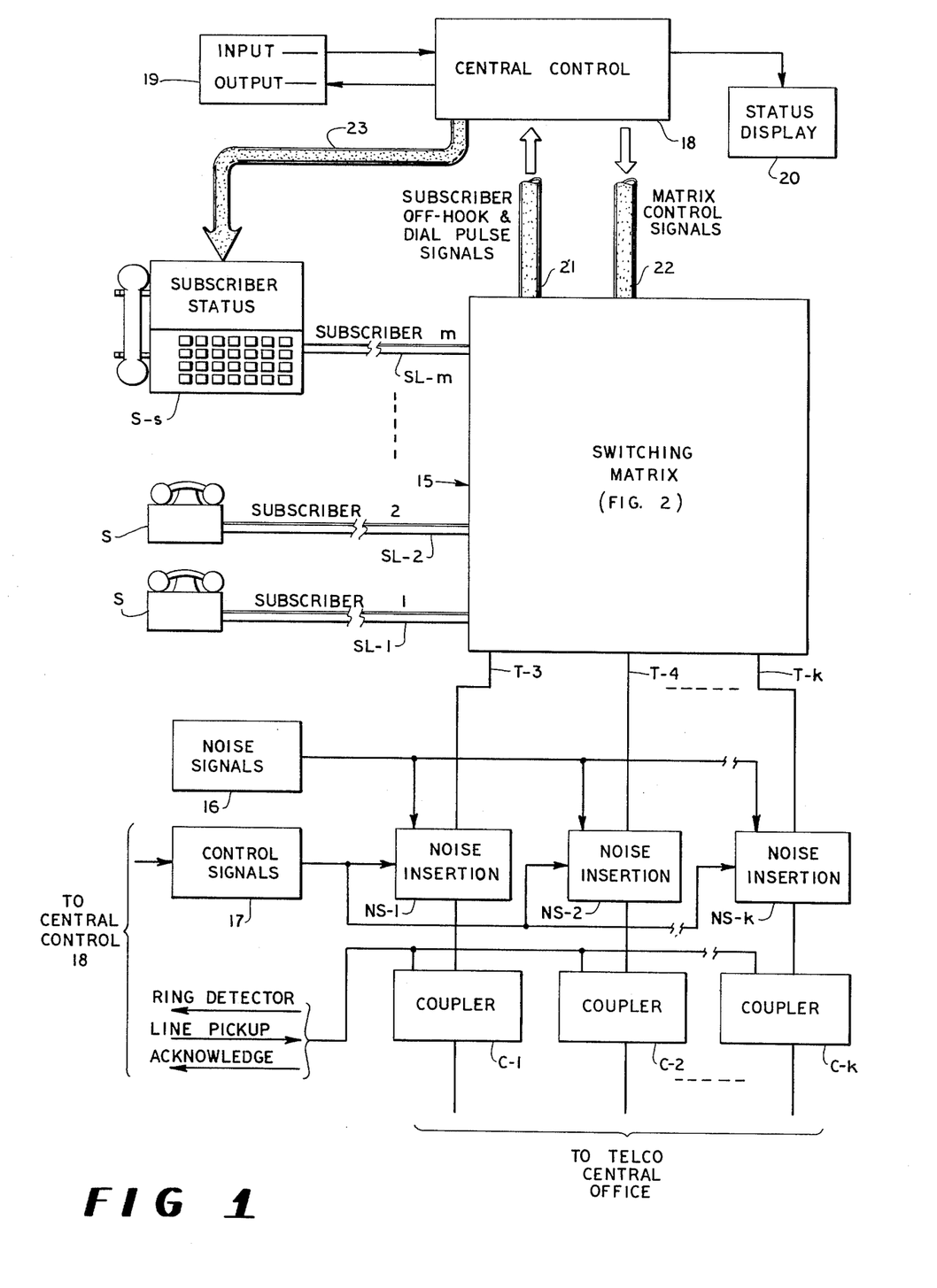
FIG. 1 shows a block diagram of an overall system according to a disclosed embodiment of the present invention.

The present invention is better understood with reference to the disclosed embodiment thereof as shown in the Figures and with particular reference to the overall system as shown in FIG. 1. FIG. 1 shows a typical PABX installation of the present invention which might be found in a hotel or motel, for example, including a plurality of subscriber telephones S connected to corresponding two-wire (in the disclosed embodiment) subscriber lines SL1, SL2 . . . SL$m$. The subscriber telephone SS connected to the subscriber line SL$m$ may be a supervisory subscriber telephone having subscriber status display signals and function control keys, in addition to the usual components associated with a conventional dial telephone S.

Figure 2A:
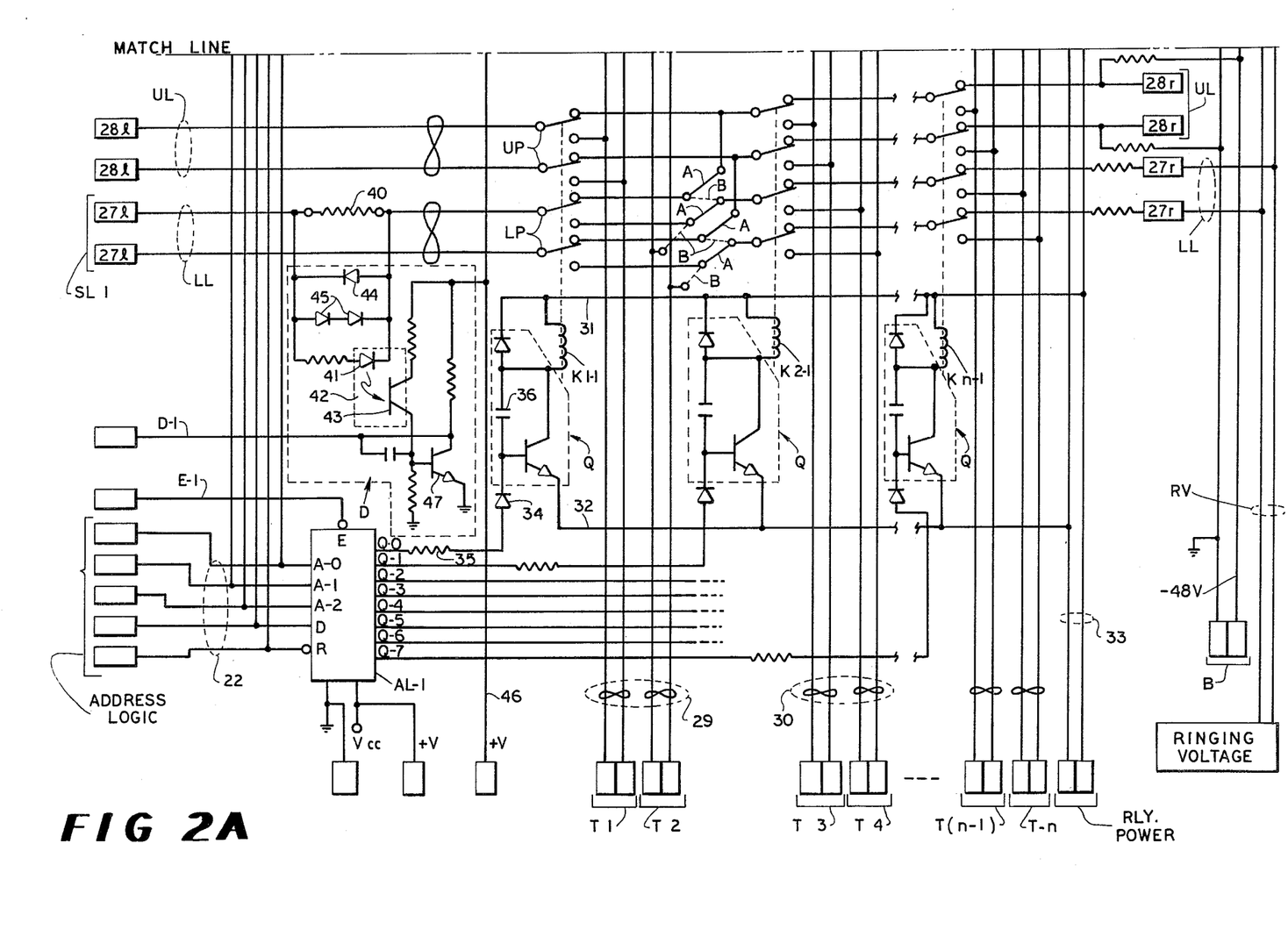
FIGS. 2A and 2B show a schematic diagram of a switching matrix according to the disclosed embodiment.
Figure 2B:
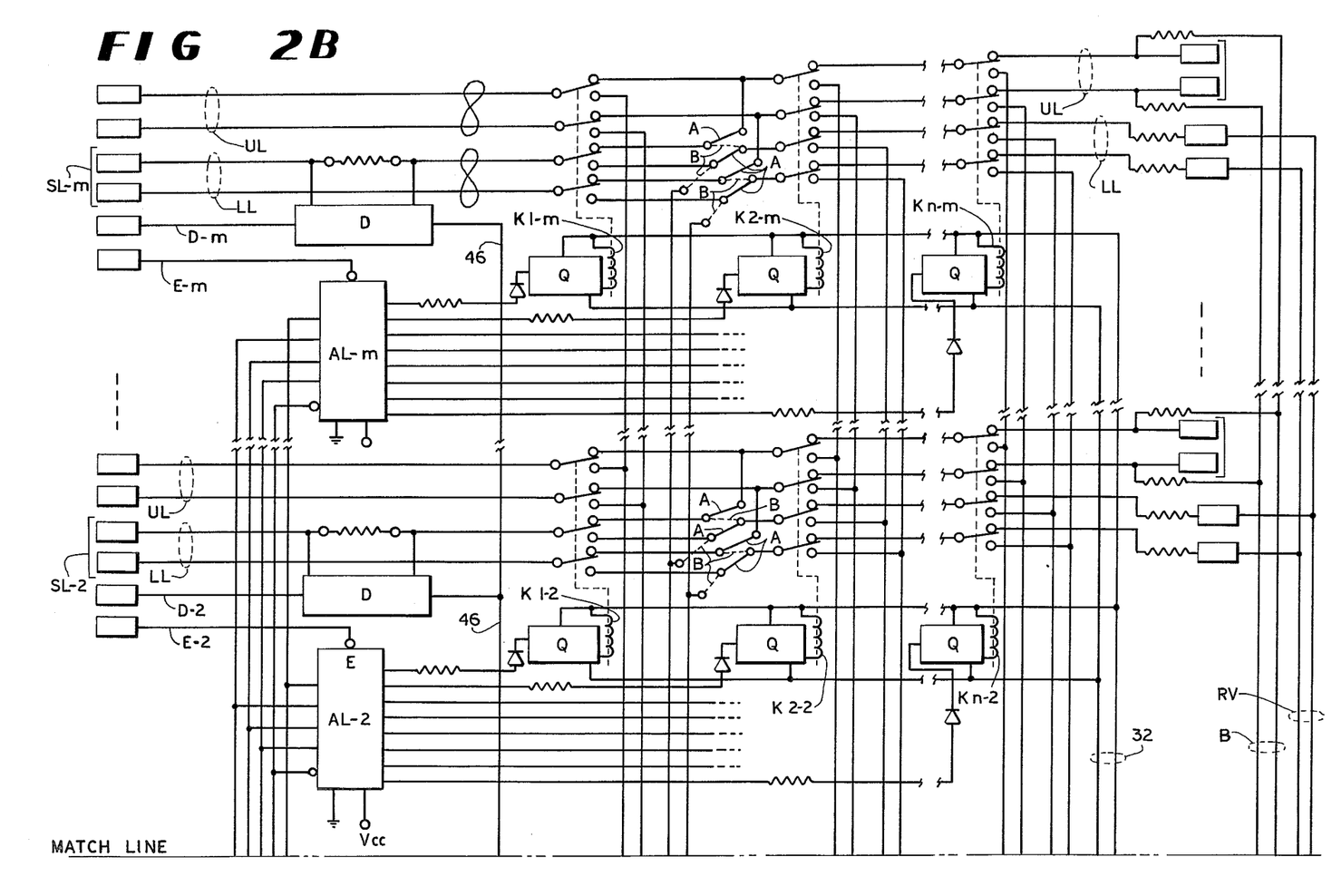

Each of the subscriber lines SL1–SL$m$ is connected to a switching matrix indicated generally at 15 in FIG. 1 and set forth in greater detail at FIGS. 2A and 2B. Assuming that the disclosed embodiment is intended for selective interconnection of various subscriber telephones S with telephone company central office trunk circuits, the switching matrix 15 is provided with a plurality of output trunks T3, T4 . . . T$k$. It will become apparent that the switching matrix 15, in the disclosed embodiment, has additional trunks T($k$+1) through T$n$ which are not connected to central office trunks and which are used for interconnection of various subscriber lines SL within the switching matrix.

Each of the output trunks T3–T$k$ is connected to a corresponding noisemaker signal circuit NS1–NS$k$, each of which is connected to receive one or more noisemaker signals from the signal source 16, and further receives noisemaker gating control signals from the control signal source 17. The term "noisemaker signals" is used herein to generically identify various types of informational signals, and to differentiate such signals from audio speech signals which originate either at a subscriber telephone S or which arrive on an output trunk T from a central office connection. Those skilled in the art will recognize that typical noisemaker signals are dial tone signals, ringback signals, howler signals, recorded music, and various repetitive recorded messages advising a connected party of status conditions such as non-working numbers and the like. Further details of the noisemaker signal circuits is provided hereinbelow with reference to FIG. 3.

Each of the output trunks T3–T$k$ is also connected to a corresponding coupler apparatus C3–C$k$, to which is connected the central office trunk line corresponding to each output trunk. Those skilled in the art will recognize that the couplers C provide the plural functions of detecting ring signals from the central office, enabling pickup of the trunk line in response to a local signal, and acknowledging the occurrence of commanded line pickup signal. Each of the couplers C also maintains the central office trunk circuit in electrical isolation from the several local control circuits utilized in ring detection, line pickup, and pickup acknowledgement. Although prior-art trunk couplers utilizing electromechanical relays can be used in the overall system of the disclosed embodiment, a novel solid-state coupler circuit is shown herein at FIG. 4 for use in the disclosed embodiment or for other applications where a telephone central office line coupler is required.

The overall operation of the switching matrix 15, as well as the noisemaker signals and the central office trunk couplers C, is controlled by a predetermined arrangement of functional control logic discussed hereinbelow and designated in FIG. 1 as the central control 18. It will become apparent to those skilled in the art that the central control 18 is advantageously a programmed general-purpose digital computer having memory and computational capacity appropriate for the number of subscriber lines SL and trunks T of a particular system, within the desired operational parameters such as answer time, system saturation, and the like. The central control 18 is provided with suitable input-output means 19, which may be one or more of a conventional Teletype or a CRT terminal connected for duplex interaction with the central control in a manner well-known to those skilled in the art. The central control 18 is also connected, in the disclosed embodiment, to drive a status display 20, on which is maintained status indications showing current availability of hotel/motel rooms.

The central control 18 is connected through line 21 to receive off-hook and dial pulse signals from each of the subscriber lines SL, irrespective of whether or not a call interconnection has been completed with the subscriber lines, and the switching matrix 15 receives switching address signals along the line 22 to control interconnect switching of the matrix. The supervisory subscriber station SS is also provided with signals along line 23 from the central control, corresponding to the current status (i.e., on-hook or off-hook) of each subscriber line SL. The subscriber status information is provided to the supervisory subscriber set SS more readily from the subscriber status signals stored in memory in the computer as set forth hereinbelow, thereby avoiding the additional wiring and associated hardware otherwise required for direct interconnection between the off-hook circuits of each subscriber line and the supervisory subscriber set SS.

The central control computer can also be advantageously programmed to drive certain well-known functions as line status light blink and the like.

The construction and operation of the switching matrix 15 is described in detail with reference to FIGS. 2A and 2B. Considering first the subscriber lines of the switching matrix, which make up the horizontal sets of lines depicted in FIGS. 2A and 2B, it is seen that an upper line pair UL and a lower line pair LL are associated with each subscriber line SL. Each lower pair of lines LL corresponds to a subscriber line pair designated SL in FIG. 1, and is available for connection to a subscriber telephone S. Each of the upper level line pairs UL is internal of the overall switching matrix 15, and provides line select and expansion capacity for the switching matrix as set forth below. Each of the upper level and lower level pairs may be provided with connective structure 27L, 28L, at the left side of the switching matrix, and 27$r$, 28$r$, at the right side of the switching matrix, for interconnection with other circuit elements. It will be understood that the connective structure 27 and 28 can be provided by connector segments on one or more circuit boards which contain the entire switching matrix structure shown and described herein. A total of m subscriber lines SL are provided.

Turning next to a consideration of the vertical lines or "trunks" in the disclosed embodiment of the present switching matrix, it is seen that the trunks are also grouped in pairs of lines, with two such trunk groupings designated in FIG. 2A as 29 and 30. With the exception noted below, each of the two pairs of lines in each trunk pair group is an active trunk pair and may extend outside of the switching matrix 15 for interconnection with a central office trunk. Thus, the trunk pair group 30 consists of the two trunk pairs T3 and T4 shown generally on FIG. 1. Other trunks, for example, trunk T($n$–1) and T$n$ may not extend beyond the switching matrix 15 and are used only as an interconnect path between selected subscriber lines SL. It will be understood that any trunk which does not extend beyond the switching matrix 15, in the disclosed embodiment, is not equipped to receive the noise signals previously described; such trunks are referred to hereinafter as "non-noisemaker trunks". Trunk pair group 29 represents the previously-mentioned exception to the general rule that each trunk is intended for switching interconnection within the switching matrix. The trunks associated with group 29 are designated T1 and T2; for reasons which will become apparent hereinbelow, trunk group 29 represents the single trunk pair group which is not used for interconnect purposes within the switching matrix of the present invention.

Each intersection of a subscriber line SL with a trunk T is provided with a selective interconnection device, with each such selective interconnection device in the disclosed embodiment being a four-pole double-throw relay. The interconnect relays in FIGS. 2A and 2B are designated by the prefix K, by a middle digit corresponding to the numerical ranking of trunk pair groups, and by a final digit identifying the subscriber line group. Thus, it is seen that the interconnect relay associated with subscriber line group 1 and the first trunk pair group is designated K1-1, and the interconnect relay associated with the second trunk pair group and subscriber line SL1 is designated K2-1. Each of the interconnect relays, which are hereinafter collectively referred to by the letter $k$, has a pair of upper poles UP associated with the upper level UL of each subscriber line group, and has a pair of lower poles LP associated with the lower level LL of the corresponding subscriber line group. When each relay K is in its inactive or quiescent state, as shown in FIGS. 2A and 2B, it is seen that the several upper poles UP allow each upper level UL to extend across the entire switching matrix without interconnecting with any trunk pair; similarly, the several lower poles LP of the interconnect relays K allow the lower level subscriber line pairs LL to extend across the entire switching matrix without contacting a trunk pair group. When an interconnect relay K is pulled in by energizing its coil, however, the upper poles UP of such relay interconnect a particular upper level subscriber line pair UL to one of the trunk pairs in the corresponding trunk pair group, and the lower poles LP of that relay interconnect the lower level subscriber line pair LL with the other trunk pair of the associated trunk pair group. Specifically considering interconnect relay K2-1, for example, it is seen that actuation of this relay interconnects the upper level UL associated subscriber line SL1 with trunk pair T3 of the trunk pair group 30, and also interconnects the lower level LL with the trunk pair T4 of that trunk pair group.

Each lower level LL within a subscriber line group shown in FIGS. 2A and 2B is connected to the corresponding upper level by jumpers designated A and positioned between interconnect relays K1 and K2 of the subscriber line group. It is thus seen that actuation of a particular interconnect relay for a subscriber line, for example, relay K2-1, selects the particular trunk group pair for interconnection with that subscriber line, and the concurrent state of the relay K1 of that same subscriber line functions as a level selector to determine which trunk pair in the selected trunk line group is actually connected with subscriber line SL1. If relay K1-1 remains deenergized while relay K2-1 is pulled in, for example, trunk pair T3 is connected through upper poles UP of K2-1, jumpers A, and the lower poles LP of K1-1 to the lower level LL and, accordingly, to subscriber line SL1. If K1-1 is pulled in simultaneously with K2-1, however, it is seen that trunk pair T4 is connected through lower poles LP of K2-1, jumpers A, and the lower poles LP of K1-1 for connection with subscriber line SL1. It will thus be seen by those skilled in the art that each relay K1 serves as a level selector switch for each of the remaining interconnect relays K2-1 ... K$n$-1 of a particular subscriber line group.

Each set of $n$ interconnect relays associated with a subscriber line has an operating coil connected to a driver Q, and each relay-driver combination is connected across lines 31 and 32 which extend to a vertical riser pair 33 on which is maintained a source of relay operating power. Each relay driver Q includes a transistor having an input circuit which is connected through a diode 34 and a resistance 35 to an output of an addressable latch AL associated with the corresponding subscriber line group. In the case of a switching matrix 15 having eight separate trunk pair groups, for example, each addressable latch AL has eight output circuits designated $Q_0$–$Q_7$ and separately connected to the drivers Q of the interconnect relays K1 through K8 corresponding with each trunk pair group. It is seen in FIG. 2 that there is a separate addressable latch AL associated with the interconnect relays for each subscriber line group, and that each of the addressable latches has inputs $A_0$–$A_2$, D, and R connected in parallel with each other. It is also seen that each of the addressable latches has an enable input E separately connected to an output line extending from the switching matrix 15. The inputs $A_0$ through $A_2$ of each addressable latch receive logic signal conditions corresponding to the identity of a particular interconnect relay K2 through $K_n$ to be energized, while the input D of each addressable latch AL receives a logic condition corresponding to the desired state (energized or deenergized) of the level select relay K1. The R inputs of each addressable latch AL receive a logic signal which resets the logic condition of the addressable latches. The construction and use of addressable latches are known to those skilled in the art and, accordingly, are not detailed herein.

Since all of the input logic conditions, except "enable" are supplied in parallel to each of the addressable latches AL1–AL$m$, it is seen that interconnection between a particular subscriber line and a particular trunk pair is accomplished by supplying along the matrix control line 22 the proper logic signal conditions which will provide signals to the drivers Q for actuating a certain trunk select relay and possibly the level select relay (K1) to achieve the desired interconnection. The aforementioned logic signals are applied simultaneously to the inputs of each of the addressable latches AL, and an enabling logic condition is applied on the particular enable line E-1, for example, corresponding to the particular individual addressable latch AL1 which is to supply decoded relay driving output signals.

Since the reset inputs R of each addressable latch AL are connected in parallel, it will be seen that each addressable latch is simultaneously reset by the appropriate logic condition applied to the addressable latches. In the construction and operation of an actual working embodiment of the present invention, it has been found advantageous to periodically reset each addressable latch to a zero-output state, followed immediately by setting each addressable latch to the output signal state (if any) corresponding to interconnect relays which must be engaged to maintain circuit interconnection. The identity of each such interconnect relay, along with the logic signal conditions identifying such relays, is conveniently maintained in memory storage as described hereinbelow; each addressable latch AL is cleared by the reset input R and is subsequently set, every ½ second. The capacitance 36 connected in each relay driver Q prevents the voltage across the energized relays from dropping out during the microsecond-interval in which the corresponding addressable latch is reset and then set. The provision of periodic reset-and-set of the addressable latches insures that an interconnect relay which has become inadvertently engaged, such as through an unwanted transient circuit condition, will remain engaged for no longer than the brief interval between successive update operations of the addressable latches. The reset-and-set provision also provides a convenient technique for desired disconnect of a previously-accomplished connection between a subscriber line and a trunk pair, inasmuch as the disconnection can be accomplished during the normal periodic reset and subsequent set which intentionally omits the interconnect relays associated with the terminated interconnection.

Turning to the extreme right side of the switching matrix as depicted in FIG. 2, there is seen a vertical riser or bus B which is connected to the upper level UL of each subscriber line group, and a vertical riser or bus RV which is connected to the lower level LL of each subscriber line group. The bus B is connected to receive 48-volt DC battery power for telephone operating purposes, while the RV bus is connected to a suitable ringing signal source. As long as all interconnect relays K1 through $K_n$ of the first subscriber line group are in the unactivated position shown in the drawing, it is apparent that battery voltage is supplied from the bus B, the upper level line UL, the aforementioned jumpers A, and the lower level line LL to the subscriber telephone S associated with subscriber line SL1. It is also apparent that subscriber line SL1 is switched from battery voltage to receive the ringing voltage available on the bus RV, by energizing relay K1-1. An exemplary control system for controlling selected application of battery voltage and ringing signals to the subscriber lines is set forth hereinbelow.

Since battery voltage from the bus B is maintained on each on-hook subscriber line SL, it is necessary to distinguish between on-hook and off-hook conditions of the various subscriber lines. This is preferably accomplished in FIG. 2A of the disclosed embodiment by the detector circuit D associated with each subscriber line SL. Each detector circuit functions to provide a signal condition corresponding to operation of either the hook switch or the dial interrupt switch in a conventional dial telephone, and so it is seen that each detector circuit D functions as a combined hook-switch and dial pulse detect circuit. Each detector circuit D includes a resistance 40 series-connected in one of the conductors which constitutes the lower level LL of each subscriber line set, and which accordingly constitutes the subscriber line SL. Connected across the resistance 40 is the light-emitting diode (LED) portion 41 of a photoisolator device 42, and the radiation output of the LED is optically coupled to provide an input to the phototransistor 43 portion of the photoisolator. A diode 44 is connected across the LED 41 for possible reverse-current protection, and a pair of diodes 45 are connected in the forward direction across the LED 41 for over-voltage protection. The collector of the phototransistor 43 is connected to line 46 to receive a suitable source of operating power, while the emitter of the phototransistor is connected to the base of a conventional transistor 47. The emitter-collector circuit of the transistor 47 is connected between the detector line D1 and ground.

Considering the operation of each detector circuit, it is apparent that no current flows through the resistance 40 so long as the subscriber telephone S remains on-hook. The absence of current flowing through resistance 40 means that no operating voltage is applied to the LED 41, so that the phototransistor 43 is non-conductive and the transistor 47 is turned off. When the subscriber telephone associated with the corresponding subscriber line goes off-hook, however, current flows from the battery bus B through the lower level LL, and the voltage developed across the resistance 40 causes the LED 41 to drive the phototransistor 43 into conductivity. This causes the transistor 47 to conduct, placing the detector line D1 at ground potential and signifying the occurrence of an off-hook condition. It will be understood, moreover, that operation of the rotary dial associated with the subscriber telephone S generates one or more make-break conditions of known relative time sequence on the subscriber line SL1, which provide a correspondingly-timed repetitive sequence of signal conditions on the detector line D-1 associated with the subscriber line SL1. Appropriate timing circuitry known to those skilled in the art can be used to discriminate between dial-pulse signals and a steady-state condition corresponding to on-hook and off-hook conditions.

Practical manufacturing and physical considerations tend to limit the actual physical dimensions of a printed-circuit board on which may be mounted the switching components comprising the switching matrix 15 as shown in FIG. 2, and so provision is made for expanding the switching matrix onto a plural number of actual circuit boards. Assuming a desired expansion of available trunk capacity, for example, one or more additional switching matrix assemblies can be electrically interconnected so that the connectors 27r, 28r of each subscriber line pair on switching matrix circuit board are interconnected with the connectors 27L, 28L of the next circuit board in an expanded trunk line sequence of circuit boards. Where the switching matrix is thus expanded horizontally (as viewed in FIG. 2) by the addition of further trunk lines, it will be understood that the battery bus B and the ringing voltage bus RV need be provided in only one of the circuit boards. It will also be seen that only one of the circuit boards need have the aforementioned jumpers A between the upper level UL and the lower level LL of each subscriber line group, and that the expansion circuit boards will instead have jumper interconnection along the lines B shown in broken-line in FIG. 2A.

NOISEMAKER SIGNAL MULTIPLEXING

Each of the output trunks T3 through T$k$ is, as mentioned above, connected to receive various types of audio noise maker signals at a location separate from the switching matrix 15. Those skilled in the art will recognize that the provision of noisemaker signal insertion which is separated from the switching matrix allows each trunk line of the switching matrix to be available for subscriber interconnect purposes, so that the desired provision of six different types of noisemaker signals, for example, will not require dedication of six switching matrix trunk lines for noisemaker purposes. While only trunks T3 through T$k$ are noisemaker-equipped in the disclosed embodiment, and are referred to herein as "noisemaker trunks," it will be understood that the remaining trunks ($n-k$), referred to herein as "non-noisemaker trunks," can also be equipped with noisemaker circuits if desired. In an actual embodiment of the present invention, it has been found that satisfactory noisemaker trunk availability is obtained with about 50% of the total trunk capacity of the switching matrix being noisemaker-equipped.

Figure 3:
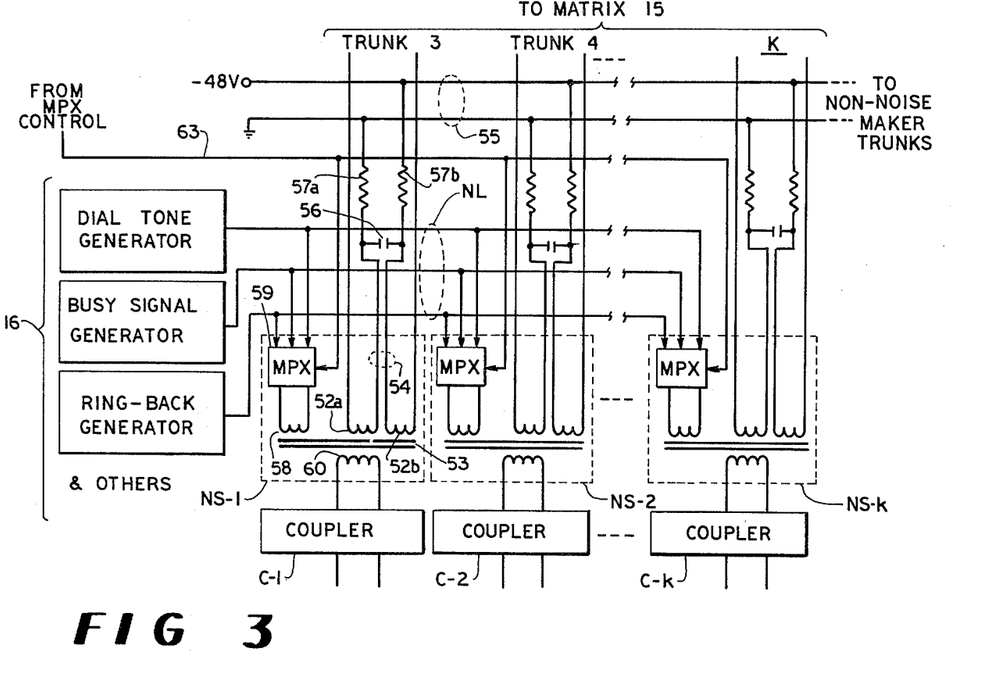
FIG. 3 shows a schematic diagram of an informational or "noisemaker" signal system according to the disclosed embodiment.

Referring to FIG. 3, the external noisemaker coupling circuit of the disclosed embodiment is shown in detail with reference to an exemplary noisemaker signal circuit NS1 associated with trunk line T3. It is seen that the lines of trunk pair T3 terminate in respective connection to the halves of a split first primary winding 52a and 52b of the audio coupling transformer 53. The other sides of the split windings 52a and 52b are connected by the pair of lines 54 to the bus 55 which receives 48-volt battery power. An audio by-pass capacitance 56 is connected across each of the line pairs 54 which supply DC power to the respective trunk lines, and series resistances 57a and 57b are inserted in the lines of each pair 54 to limit the maximum amount of current which can flow through each of the split primary windings and the corresponding trunk pairs.

The coupling transformer 53 has a second primary winding 58, coupled to a signal multiplexing circuit 59. The second winding 60 of the transformer 53 is connected to the coupler C1 associated with the outside trunk line.

The multiplexer circuit 59 in each of the noisemaker circuits NS is connected to receive a number of so-called noisemaker signals on corresponding noisemaker signal lines NL, which receive noisemaker signals from suitable audio signal sources collectively designated at 16. The noisemaker signals, as previously mentioned, may include a dial tone generator, a busy signal generator, a ring-back signal generator, and a "howler" signal generator, all of which are known to those skilled in the art. Other sources of noisemaker signals may include recorded music for application to calls being "held", and one or more recorded announcement sources which advise the listener that a called subscriber line is not working or is otherwise unavailable.

Each of the multiplexer circuits 59 also receives multiplex control signals on the line 63. Those skilled in the art will recognize that the multiplex control signals are preferably provided in digital logic form, and that the line denoted at 63 will accordingly comprise a plurality of separate circuits connected to receive digital logic signal conditions. Each of the multiplex circuits 59 comprises an electronic audio circuit switch, such as an FET switch, associated with each noisemaker input and selectively gated on or off in response to a gating signal. Each of the multiplex circuits 59 also includes appropriate logic decoding means which receive the logic signals on the line 63, corresponding to a certain selected multiplexer circuit NS and to a certain selected noisemaker signal, and the decoding means decodes such input signals to provide the appropriate FET audio switch with a gating signal allowing the selected noisemaker signal to be gated to the second primary winding 58 of the coupling transformer 53. The selected noisemaker signal is coupled into both the split first primary windings 52a, 52b of the transformer as well as to the secondary winding 60, so that the selected noisemaker signal is supplied to the one or more subscriber lines SL interconnected with the particular trunk in the switching matrix 15 and is also supplied to the coupler C1 for possible transmission to the telephone company central office for reception by an outside calling party.

DC battery voltage through each primary winding 52a, 52b to each trunk is provided for the following reason. It will be recalled that there is a battery voltage bus B, associated with the switching matrix 15, which normally maintains battery voltage on each on-hook subscriber line SL. When one of the interconnect relays K associated with a particular subscriber line is actuated, however, that subscriber line is removed from the bus B and is connected either to the ringing voltage bus RV or to a trunk line T, thereby removing battery voltage from the subscriber line. When a speech circuit including a subscriber line and associated subscriber telephone S is completed, however, the subscriber telephone must be supplied with battery voltage for operation. Such battery voltage is provided from the bus 55 through the appropriate trunk line.

From the foregoing description of the noisemaker multiplex circuit, it will be seen that any available noisemaker signal can be supplied to any selected noisemaker trunk for application both to internal subscribers and to external equipment, and that such interconnection does not require any dedication of trunk lines within the switching matrix 15. Moreover, each noisemaker trunk can be selectively provided with any of the available noisemaker signals merely through multiplex control operation.

THE COUPLER CIRCUIT

Figure 4:
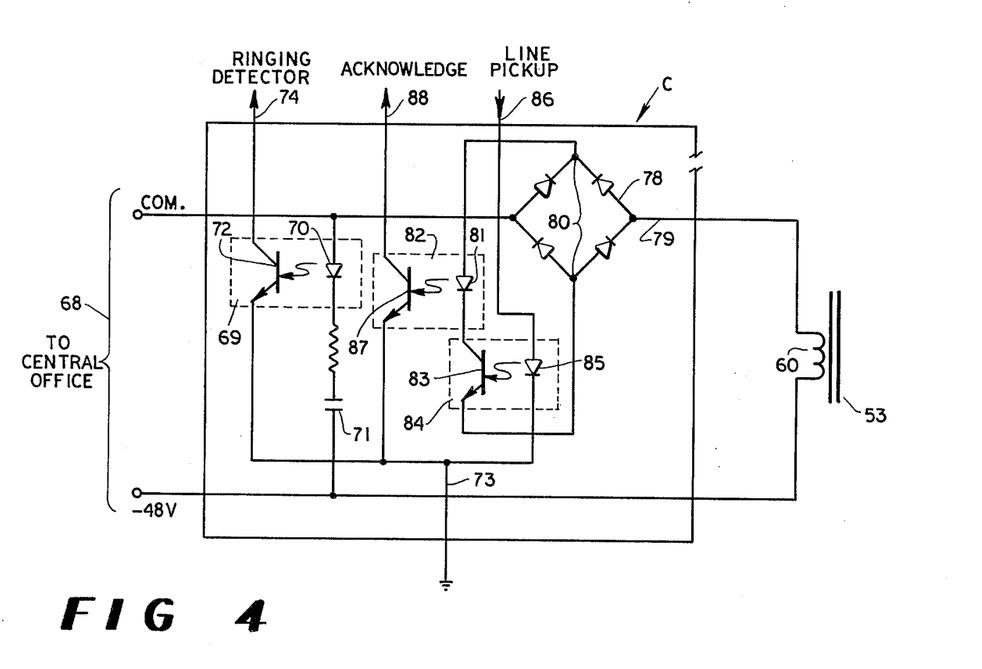
FIG. 4 shows a schematic diagram of a central office coupler according to the disclosed embodiment.

FIG. 4 shows a disclosed embodiment of telephone central office circuits according to the present invention. Those skilled in the art will understand that such coupler circuits are customarily provided as an interface between telephone company central office lines and equipment which is locally installed at a subscriber's location. Such coupler apparatus normally maintains an open-circuit condition between the local subscriber apparatus and the trunk circuit leading to the central office, and provides an output signal condition when ringing voltage appears on the central office trunk. The coupler also functions to interconnect the central office trunk with the local equipment, in response to a line pickup signal. The present coupler provides a further output signal condition acknowledging the occurrences of line pickup.

Turning now to FIG. 4, there is seen a coupler circuit C connected between a secondary winding 60 of a coupling transformer 53 and a typical central office trunk circuit 68, on which a DC battery voltage is present. The ringing detector circuit of the coupler C includes a photoisolator device 69 having a light-emitting diode (LED) 70 connected in series with a DC blocking capacitance 71 across the central office trunk 68. Illumination output of the LED 70 is optically coupled to the phototransistor 72, having an emitter-collector circuit connected between ground 73 and a ringing detector output line 74.

The line pickup portion of the coupler C includes a diode bridge 78 connected in series with one side 79 of the central office trunk, with the bridge 78 polarized to block current flow through the line 79 resulting from the central office battery voltage. The opposite corners 80 of the bridge 79 are connected in series with the LED 81 of a second photoisolator 82 and the emitter-collector circuit of a phototransistor 83 associated with a third photoisolator 84. The LED 85 of the photoisolator 84 is connected between the line pickup input line 86, while the emitter-collector circuit of the phototransistor 87 associated with the second photoisolator 82 is connected between ground and the pickup acknowledge line 88.

The operation of the coupler C is as follows. Current flow normally cannot occur through the coupler, because of the blocking capacitance 71 and the selected polarity of the diodes in the bridge 78. The presence of an AC ringing signal on the central office trunk 68 causes current flow through the LED 70, however, thereby establishing a closed-circuit condition through the phototransistor 72 to ground. The occurrence of ground potential on the ring detector output line 74 thus corresponds to the occurrence of a signal on the central office trunk.

When it is desired to interconnect the central office trunk 68 with the coupling transformer 63 (or any other local subscriber equipment), a voltage of positive polarity is applied to the coupler C along the pickup line 86. Current flows through the line 86 and the LED 85, driving the phototransistor 83 into conductivity and establishing a DC current path through the bridge 78 and the line 79 of the central office trunk, and thereby signifying to central office equipment that line pickup has occurred. The current flowing through the line 79 at this time also flows through the LED 81 of the photoisolator 82, thereby driving the phototransistor 87 into conductivity and establishing a ground signal on the pickup acknowledge line 88. The presence of a ground signal on the pickup acknowledge line 88 may be used as a signal which enables the operation of subscriber equipment. For example, a subscriber line SL which has been connected through the switching matrix 15 to an outside trunk T in response to a dialed request for an outside line, would cause initiation of a line pickup signal to the line 86 of the appropriate coupler and, in response to an acknowledge signal on the line 88, could commence outpulsing dial pulses to the central office.

CENTRAL CONTROL OF SYSTEM

The system described herein and shown with reference to FIG. 1, including the switching matrix, the noisemaker multiplixers, the central office trunk couplers, and other operational components described below, are operated as a system in response to central control apparatus 18. The central control apparatus receives input data including the subscriber off-hook and dial pulse information on line 21 and the output signals from the couplers C, and provides switching control signals along line 22 to the addressable latches which control the interconnect relays of the matrix. Central control 18 also provides multiplex control signals to the noisemaker devices NS, and line pickup signals to the couplers C. A detailed step-by-step description of central control operation follows, and it will be understood that the central control stucture and function is preferably provided by a programmed digital computer of a type available in the art. An actual working embodiment of the present invention employs a minicomputer manufactured by Computer Automation, Inc. of Irvine, California designated by the manufacturer as Model Alpha-16. This computer has core memory of 8192 words and has proven satisfactory in the control of a switching system having 200 subscriber lines SL and a total of 24 trunk lines T (both noisemaker and non-noisemaker trunks). Those skilled in the art will recognize that memory capacity of programmed digital computers is expandable by the addition of memory modules such as core storage, semiconductor storage, disc memory and the like, if needed to accommodate switching systems having an increased number of subscriber lines and/or trunk lines. The actual programming of such computers to perform the operational steps described herein is within the capabilities of the programmer of ordinary skill in the art.

Figure 5:
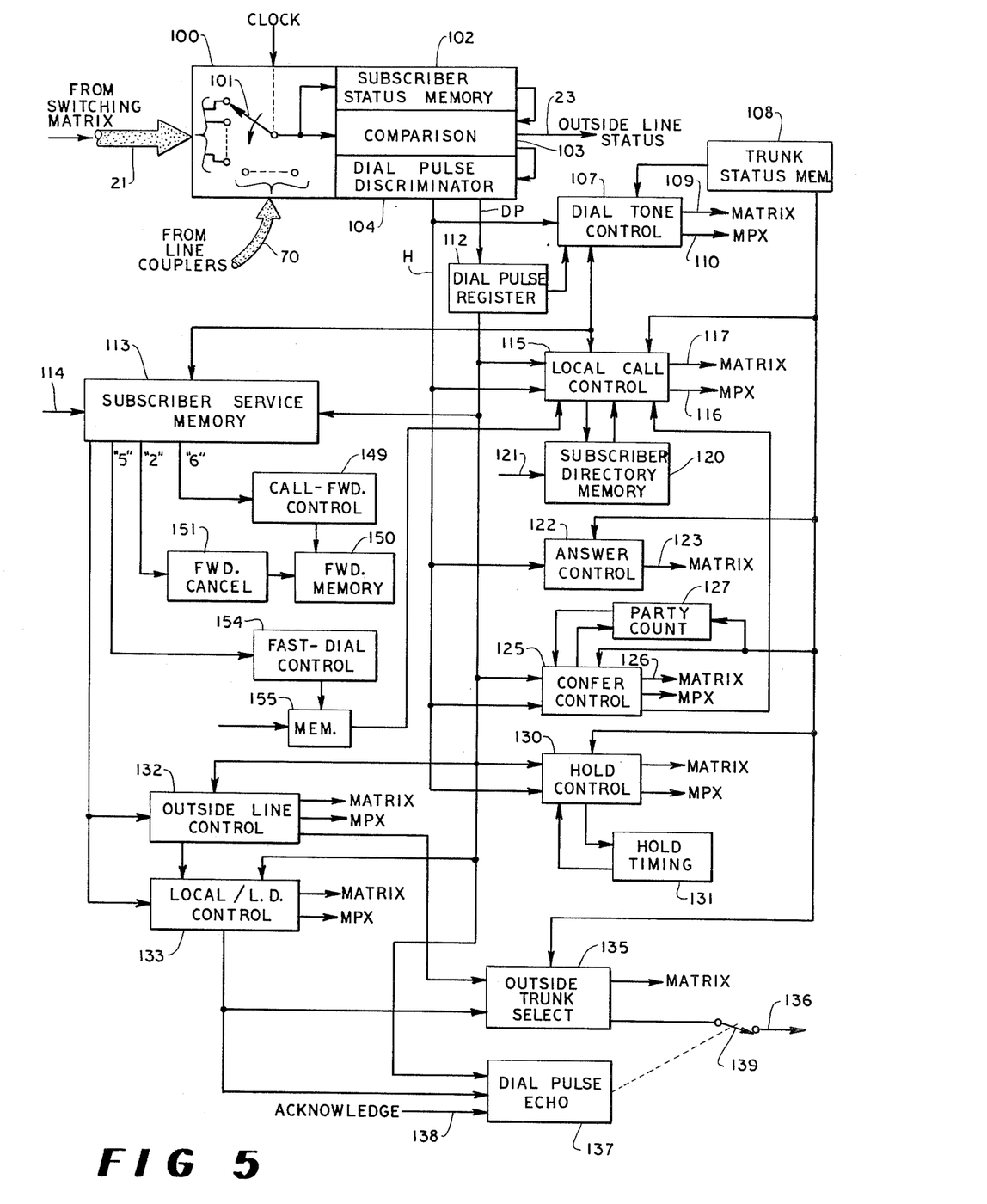
FIG. 5 shows in functional schematic form a disclosed embodiment of the data control system according to the present invention.

It is important to the successful operation of the present system that the dial pulse/hook switch lines D of each subscriber line SL be constantly monitored at all times irrespective of the current status of the subscriber line. Monitoring of the hook switch lines collectively designated at 21 is shown in FIG. 5 by the dial monitor apparatus shown at 100 and including cyclic line scanner 101 which is driven in response to a clock input to repetitively look at the signal status of each detector line D-1, D-2 ... Dm from the corresponding detector circuits D associated with the subscriber lines SL and shown in FIG. 1. It will be understood that cyclic scanning of each detector line D is accomplished through electronic switching, so that the status of each subscriber line may be observed as often as every 0.1 second, for example. The output of the cyclic line scanner 101 is supplied to subscriber status memory 102, in which is stored the detected status (e.g. on-hook or off-hook) of each subscriber line during the previous scanning period of that line. The current status and the previous status of each subscriber line is supplied to comparator 103, which functions to determine whether or not the current status represents a change in the status of the lines. The subscriber status memory 102 is constantly updated in response to current subscriber line status information from the line scanner 101, so that the subscriber status memory remembers only the immediately-preceeding status of each subscriber line.

The comparator 103 provides an output to the dial pulse discriminator 104, which differentiates between signal states on the detector lines D caused by hook switches conditions, e.g., on-hook or off-hook, and between the make-break dial pulse signals which occur on the lines D. Those skilled in the art recognize that the "make" and "break" portions of dial pulse signals produced by a conventional rotary telephone dial have precisely timed duration and interrelation, and the discriminator 104 is responsive to the detected presence of signals corresponding to dial-pulse timing to provide a dialed-digit information signals on the dial pulse signal line DP. Status information corresponding to a change in status of a particular subscriber line, e.g., when the line goes on-hook or off-hook, is detected by the discriminator 104 and is provided on the hook switch status line H. It will be understood that the dial pulse signal information on the line DP and the hook switch status information on the line H are provided in the form of logic signal information which conveys both the dial pulse (or hook switch status) information and also logic signal information corresponding to the identity of the particular subscriber line SL.

For example, assume a current scan of subscriber lines indicates a signal condition on detector line D-1 corresponding to an off-hook condition of the corresponding subscriber line SL1, and that a comparison with the previous status of that line as stored in subscriber line memory 102 indicates, that the line was previously on-hook. If the off-hook status of detector line D-1 maintains for more than the make time of a dial pulse, the discriminator 104 provides a logic signal on the line H identifying the fact that subscriber line SL1 is off-hook, and this information is received by the dial tone control 107. Since the calling party on subscriber line SL1 must be initially connected to an available noisemaker trunk of the switching matrix to receive a dial tone signal, the dial tone control 107 receives signals from the trunk status memory 108 corresponding to the availability status of each trunk, both noisemaker and non-noisemaker. If the signals received from the trunk status memory 108 indicate that a noisemaker trunk is available, the dial tone control 107 provides the proper logic signal information on the line 109 to the parallel-connected addressable latches AL, and the particular enable line E-1, to interconnect the subscriber line SL1 with an available noisemaker trunk. If noisemaker trunk T3 is available and selected for interconnection with subscriber line SL1, for example, line 109 will provide a logic signal condition which is interpreted by addressable latch AL1 to pull in the interconnect relay K2-1 shown in FIG. 2A.

The subscriber line SL1 is now connected with a noisemaker trunk, and dial tone control 107 supplies the appropriate logic signal information on the MPX line 110 to the noisemaker control line 63 (shown in FIG. 3) which gates the noisemaker switch NS1 to supply dial tone audio to the primary winding 58 of the coupling transformer 53 associated with selected noise maker trunk T3. The subscriber line SL1 is now receiving dial tone, and the calling party may now dial the first digit of a desired number. If the trunk status memory 108 indicated that no noisemaker trunk was available, then no dial tone would have been provided on the MPX line.

The calling party on subscriber line SL1 will next dial one or more digits corresponding to a "called party", and it is here assumed for illustrative purposes that the called party is another subscriber line SL. The dial pulses from subscriber line SL1, along with the identity of such line, are received and stored in the dial pulse register 112, and the occurrence of the first dialed digit is signalled to dial tone control 107 which outputs on the MPX line 110 a signal condition terminating the dial tone noisemaker connection to the previously-selected trunk associated with subscriber line SL1. Signals corresponding to the called number and the identity of the calling party are also supplied to the subscriber service memory 113, in which is stored information signal conditions pertaining to allowable classes of service for each subscriber line. Certain subscriber lines, for example, may be allowed to place and/or to receive only "local" calls, i.e., calls with other subscriber lines. Other subscriber lines may be allowed more extended classes of service such as toll-free area outdialing, outdialing only to selected central-office exchange prefixes, or unlimited outdialing. The subscriber service memory may also contain information that a particular subscriber line is to be entirely out-of-service, and such information is made available to dial tone control 107 so that anyone attempting to place a call on such a subscriber line will not receive dial tone. The subscriber service memory 113 is preferably provided with a suitable data input means 114 to enable the service status of any individual subscriber line to be changed whenever desired.

If the called party indicated by the information signals stored in the dial pulse register 112 is not permitted to the calling party or is otherwise unavailable for service, as indicated by signal conditions previously stored in the subscriber service memory 113, dial tone control 107 outputs a signal on the MPX line 110 to supply the calling-party trunk with an appropriate recorded announcement. If the subscriber service memory 113 indicates that the called party is permitted and available, however, an appropriate signal condition is supplied to the local call control 115 along with logic signal information identifying the specific subscriber line to which the called-party number is assigned. Assuming that the called party is subscriber line SL2, for example, the hook switch status of that line is made available on the hook switch line H to the local call control 115, and the matrix interconnect location corresponding to SL2 is provided by signal conditions stored in subscriber directory memory 120. If the called line is currently off-hook i.e., "busy", the local call control provides a signal output on its MPX line 116 to apply a busy-signal condition to trunk T3 which was previously interconnected with calling-party subscriber line SL1. If the called line SL2 is not busy, however, local call control 15 initially determines from information signals in trunk status memory 108 whether a noisemaker trunk is presently available and, if so, provides a logic signal condition on line 117 to the switching matrix which interconnects the subscriber line SL2 with an available noisemaker trunk.

If the trunk status memory 108 indicated that only non-noisemaker trunks were available when SL1 goes off-hook, local call control 15 would determine from trunk status memory 108 whether a noisemaker trunk is presently handling a local call which could be transferred to a non-noisemaker trunk. If such is available, then the existing call is transferred by the local call control and then SL1 would be connected to the noisemaker trunk thus made available.

Assuming that trunk T$n$ represents an available non-noisemaker trunk, the output signals on line 117 would command operation of interconnect relays K1-2; reference to FIG. 2B shows that engagement of such relay substitutes ringing voltage on the bus RV for the battery voltage previously applied to the called subscriber line SL2, and so the telephone S associated with subscriber line SL2 commences ringing. Calling subscriber line SL1 remains on its trunk T3 at this time, and is supplied with a ring-back signal in response to an appropriate signal condition on MPX line 116.

When the called subscriber line SL2 goes off-hook in answer to ringing, the new off-hook status of the called party is supplied along line H to the answer control 122. If a non-noisemaker trunk is available at the time, as indicated by trunk status memory 108, the answer control 122 supplies appropriate logic signals along the line 123 to the switching matrix to interconnect the called line SL2 with a non-noisemaker trunk. The calling line SL1 is withdrawn from its previously-interconnected noisemaker trunk and is instead connected to the selected non-noisemaker trunk, thereby completing the desired connection between the calling line SL1 and the called line SL2 and freeing the noise maker trunk T3 for subsequent use. Assuming that trunk $T_n$ is a non-noisemaker trunk which was selected by answer control 122, then signals would be supplied to the appropriate addressable latches AL1 and AL2 to release previously-engaged interconnect relay K2-1, to engage the interconnect relays K$n$-1 and K1-1 (interconnecting SL1 with T$n$), and engaging K1-2 and K$n$-2 (interconnecting SL2 with T$n$). The dialed call between subscriber lines SL1 and SL2 is now completed.

The use in the present system of a non-blocking switching matrix as described hereinabove, along with the use of programmed control means, enables numerous special operational features to be relatively easily added to the present system. For example, a two-party call completed as described above, can be expanded into multiparty conference call with the confer control 125. A conference call is created by one of the parties to a completed call dialing a selected first digit, such as the digit 4, followed by the number assigned to the additional called party. The confer control 125 is responsive to the proper first digit to transfer the presently-connected subscriber lines to an available noisemaker trunk in response to appropriate logic address signals supplied to the switching matrix on the line 126. The switched subscriber lines can be supplied with dial tone from the noisemaker trunk, if desired, whereupon the remaining subscriber line digits are dialed by a connected subscriber and received by the dial pulse register 112. The confer control causes completion of a call sequence as described above, with local call control 115 receiving appropriate information from the subscriber service memory 113 and subscriber directory memory 120, and then initiating ringing of the third-party subscriber line, if available. When the third party answers, his line and the other subscriber lines of the conference call are transferred to a non-noisemaker trunk, if available.

The number of parties which can be added to a conference call in the foregoing manner may be limited by the party counter 127, which receives and stores signals corresponding to the number of subscriber lines interconnected with each trunk. The party counter 127 also contains signal information corresponding to a predetermined maximum number of allowable subscriber lines on any particular trunk, and provides the confer control 125 with a "trunk full" signal indicating that no further party may be added to a particular trunk. If an attempt is made thereafter to increase the size of a conference call on such a trunk, the existing parties to the call are transferred to a noisemaker trunk and receive a busy signal. The maximum number of allowable parties to a conference call is typically limited by audio power considerations.

Each subscriber which has completed a call with the present system may also place the called party on "hold" by dialing a predetermined digit corresponding to the hold function. The occurrence of this digit, such as the digit 3, is supplied to the hold control 130, and the hold control provides appropriate address signals to the switching matrix to transfer the subscriber line which dialed 3 from the non-noisemaker trunk (to which two or more previously-connected subscribers were assigned) to an available noisemaker trunk. The party that dialed 3 is now supplied with a dial tone, and may either hand up his telephone or may dial another separate number. The one or more parties on "hold" remain on the non-noisemaker trunk. The party that initiated the hold condition can, by again dialing 3, cause the hold control 130 to terminate the hold condition by returning such party to the non-noisemaker trunk on which the "held" party (or parties) remained. If the party which initiated the hold hung up his phone, the on-hook condition of this subscriber line on the line H is sensed by the hold control 130, and the hold timing means 131 initiates a predetermined timing period. At the end of this timing period, which may be in the order of 2 minutes, assuming that the hold-initiating party remains on-hook, the hold control signals the switching matrix to connect such party to the ringing voltage bus RV. When the holding party picks up his telephone, he is automatically reconnected to the party previously placed on hold.

If a subscriber wants to call an outside party, he dials a preassigned initial digit, such as the digit 9, followed by the area code (if applicable) and the number of the called party. The initial digit appearing on the dial pulse line DP and received by the dial pulse register 112 causes the outside line control 132 to determine whether signals stored in the subscriber service memory 113 indicate that the calling party is entitled to make an outside call. If the calling party is not so entitled, the calling party is connected to a noisemaker trunk and the outside line control 132 supplies an MPX control signal to provide the calling party with an appropriate information response such as a busy signal or a recorded announcement. If information stored in the subscriber service memory 113 indicates that the outside call is permitted to the calling subscriber, however, the local/long distance control 133 observes the next three dialed digits and, if such digits correspond to an area code, determines from the subscriber service memory 133 whether the calling subscriber is entitled to a class of service including the particular dialed area code. If the next three digits indicate that a local call has been dialed, the local/long distance control 133 consults the subscriber service memory 113 to determine whether the calling subscriber is permitted to call the dialed exchange. If signals stored in the subscriber service memory 113 indicate that a dialed long-distance or local call is not the class of call permitted to the dial calling subscriber, that subscriber is connected to receive the appropriate recorded message or other noisemaker signal as previously mentioned.

Assuming that the dialed outside call is permissible to the calling subscriber, the outside trunk select means 135 becomes operative to select an available noisemaker trunk which is associated with an available central office line, as indicated by the trunk status memory 108. The outside trunk select means 135 applies a line pickup signal along the line 136 to the appropriate pickup line 86 of the coupler C associated with the selected outside line, and the pickup acknowledge signal provided on the line 88 of the coupler is supplied to the dial pulse echo means 137 by way of the line 138. The dial pulse echo means receives signals from the dial pulse register 112 corresponding to the dialed number, and repeats the dialed number by pulsing the switch 139 in the line 136 supplying the line pickup signal to the coupler, so that the flow of current from the central office in the selected outside line is interrupted. The calling subscriber line is connected to the outside trunk at this time, and is thus coupled to the central office.

The presence of incoming calls from the telephone company central office is detected by a ringing signal condition output from the corresponding line coupler C as previously mentioned, and the ringing detector lines of all couplers are also supplied to the dial monitor apparatus 104 scanning by cyclic line scanner 101. A change in the status of each outside line is detected by the comparator 103 and provided on the line 23 to provide an appropriate indication on the supervisor telephone SS. The ringing outside line is answered by appropriate controls on the supervisor telephone, causing line pickup of the outside line to occur in response to an appropriate line pickup signal supplied to the coupler associated with that line.

ROOM AVAILABILITY STATUS

Figure 6:
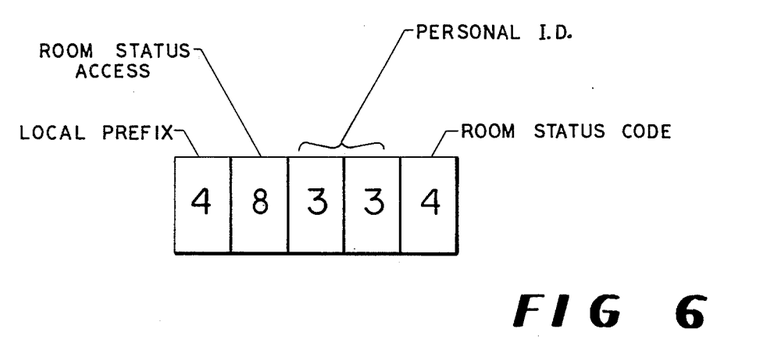
FIG. 6 shows a typical room status dial code used in a disclosed embodiment of room status systems.

The present system is readily applicable to receiving non-interconnect data information from the various subscriber lines. If the present system is installed in a hotel or motel, for example, the system can be used to maintain a constantly-updated status report on each room within the hotel without requiring actual verbal communication between maids or maid supervisors and a central location. Turning to FIG. 6, there is shown a typical five-digit number which contains information necessary to enter room status information from a room telephone into a central location. The first digit (4) is the local or internal-prefix digit corresponding to all calls within the system, while the second digit (8) is a digit which is unassigned to any room or other subscriber telephone and which arbitrarily designates a room status access code. The two middle digits (33) may be any two digits previously assigned to designate and identify particular persons, such as a particular maid, room supervisor, or the like. The last digit is one of several selected room status code digits, arbitrarily chosen to designate a corresponding number of room status conditions. The digit 1 may, for example, indicate that the room has just been entered for cleaning, while the digit 4 may mean that the room has been cleaned and is available.

Figure 7:
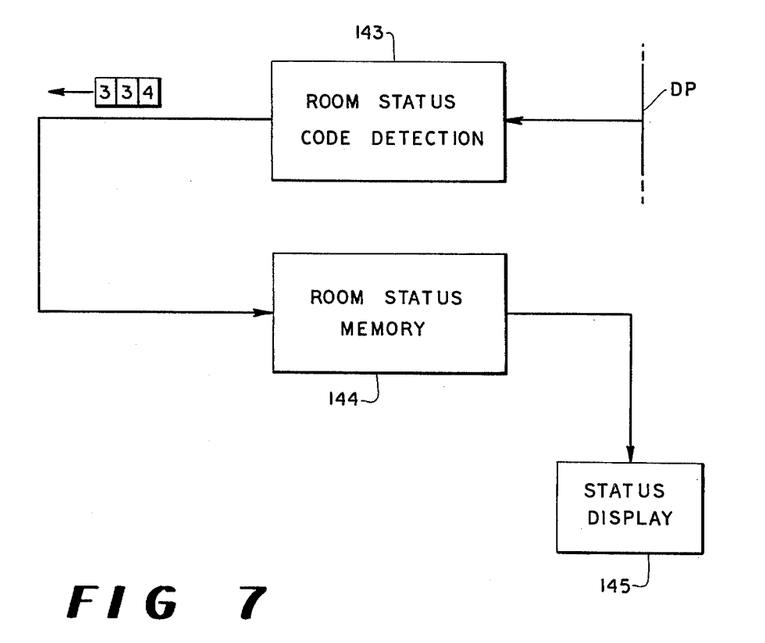
FIG. 7 shows a functional schematic embodiment of the disclosed room status systems.

Turning to FIG. 7, it is seen that the dial pulse signals on the line DT are provided to a room status code detector 143. When a five-digit room status number is dialed on any subscriber line, the second-digit room status access code is recognized by the room status code detector 143 as a non-extension number which is not entitled to interconnect with any other line. The last three digits of the number are supplied to the room status memory 144 along with signal conditions received from the dial pulse line DP corresponding to the identity of the calling subscriber line, and the room status memory is updated to contain information signals showing that "person 33" has called from the room to which the subscriber line corresponds, and that the status of such room is the status assigned to the particular room status code. The current status information of each room, as contained in the memory 144, may be displayed in any suitable manner or by the status display 145. The status display 145 may, for example, take the form of a status board having rows and columns of electric lamps corresponding to the individual rooms (i.e., subscriber lines) and the particular room status condition currently in memory for each such room. Alternatively, the status display 145 may be a CRT display of conventional construction and operation, upon which can be displayed the status information of one or more rooms.

Other special call features are available with the switching system of the present invention. For example, a subscriber who will be away from his usual telephone may pick up his telephone an dial a previously-assigned "call forward" digit, followed by the complete subscriber number of another subscriber line where he can be reached. The digit 6 is assigned to initiate the call forward function in the disclosed embodiment, and the presence of a first-digit 6 is recognized by the subscriber service memory 113 and is supplied to the call forward means 149. The dialed digits which follow the call forward code are received and stored in the call forward memory 150, which is interconnected with the subscriber directory memory 120. After a call-forward condition is recorded in the call forward memory for a particular forwarding subscriber line, subsequent calls to that line will, when local call control 115 looks to the subscriber directory memory for signal conditions corresponding to the switching matrix location of the called subscriber line, receive signals stored in the call-forward memory 150 corresponding to the identity of the subscriber line previously entered in the call-forward memory. This call forwarding information is supplied to local call control 115, whereupon appropriate signals are supplied to the switching matrix for interconnecting the calling subscriber line with the appropriate subscriber line to which such calls were instructed to be forwarded.

A previously-established call-forward condition is cancelled simply by dialing a pre-assigned "forward-cancel" digit, such as the digit 2, on the subscriber line which previously initiated the forward condition. The digit 2 is recognized by the subscriber service memory 113 and is supplied to the cancel means 151, which supplies the call forward memory with a signal condition cancelling the previous call-forwarding signals stored with respect to the forwarding subscriber line.

The call forward means 149 can, if desired, be conveniently programmed to block all incoming calls to a particular subscriber line. Thus, a subscriber who dials the call-forward digit 6 followed by a predetermined code such as 0000 causes the call forward memory 150 to receive and store a signal condition indicating that the particular subscriber line shall not be interconnected with any other calling party, and that such other calling party will only receive a selected noise maker signal such as a busy signal or a ring-back signal.

The present system is also provided with a "fast-dial" feature, whereby a subscriber can dial a fast-dial code digit (such as the digit 5) followed by another digit ($x$) which corresponds to any complete subscriber line number. When a subscriber dials the fast-dial digit 5, this digit is recognized as a desired class of service by the subscriber service memory 113 and an appropriate signal condition is supplied to the fast-dial means 154. The single dialed digit $x$ following the fast-dial code is supplied to the fast-dial memory 155, which has been provided with signal conditions correlating up to 10 individual digits with a corresponding number of subscriber line numbers. The dialed $x$ digit, when received by the fast-dial memory, provides the local call control 115 with signal conditions identifying the called subscriber line, in response to which the appropriate switching matrix signal conditions are provided by the local call control. The signal conditions within fast-dial memory 155 may be changed by appropriate input signals on the line 156.

It will be apparent to those skilled in the art that the foregoing relates only to a disclosed embodiment of the present invention, and that numerous alterations and modifications may be made therein without departing from the spirit and the scope of the invention as defined in the following claims.

What is claimed is:

1. Apparatus for selectively coupling a telephone central office circuit to subscriber equipment, comprising:

first solid state means having a control circuit which is operatively coupled to said central office circuit and responsive to a ringing signal on said central office circuit to provide a signal on a ring detection circuit which is electrically isolated from said central office circuit;

switch means connected to said central office circuit and selectively operative to complete a circuit interconnection between the central office circuit and a subscriber circuit;

second solid state means having a control circuit which can receive a line pickup signal which is electrically isolated from said central office circuit and which is operative in response to said line pickup signal to control said switch means to complete said circuit; and third solid state means having a control circuit which is connected to be responsive to current flow through said central office circuit and through said switch means to provide an output signal on a line pickup acknowledge circuit which is electrically isolated from said central office circuit.

2. Coupling apparatus as in claim 1, wherein each of said solid state means comprises a photoisolator.

3. Coupling apparatus as in claim 1, wherein said control circuit of said first solid state means comprises photoisolator means having a light-emitting means connected to be responsive to ringing voltage on said central office circuit, and a photoresponsive means operative in response to said light-emitting means to provide said signal on said ring detection circuit.

4. Coupling apparatus as in claim 1, wherein:
said switch means comprises a diode bridge circuit connected in series between said central office circuit and said subscriber circuit,
said bridge circuit being polarized to block current flow directly therethrough and being operative to permit current flow through a path which includes a pair of points on said bridge circuit and an external circuit connected between said bridge points; and
said control circuit of said second solid-state means comprises photoisolator means having a light-emitting means operative in response to said line pickup signal, and having a photo-responsive means connected in said external circuit and operative to complete a conductive path through said bridge circuit in response to said light-emitting means.

5. Coupling apparatus as in claim 4, wherein:
said third solid-state means comprises photoisolator means having a light-emitting means connected in series with said diode bridge circuit to receive operating current from said central office circuit in response to said establishment of a circuit through said photoresponsive means of said second solid-state means and said bridge circuit; and
said photoisolator means of said third solid-state means comprises a photoresponsive means connected to said line pickup acknowledge circuit.

6. An addressable N × M switching matrix, comprising:
a first number M of subscriber lines in parallel matrix array, each subscriber line comprising at least a pair of conductors for connection with a separate subscriber station;
a second number N of trunk lines in parallel matrix array with each other and in crossing relation with each of said subscriber lines, each of said trunk lines comprising at least a pair of conductors;
switching means separately and independently associated with each crossing point of subscriber lines and trunk lines in said matrix, each said switching means being selectively operative to connect a subscriber line to the trunk line at such crossing point; and
a number M of addressable switch actuating means;
one of said addressable switch actuating means being operatively associated with all of said switching means for said crossing points of a particular subscriber line, with each said addressable switch actuating means being operative to enable any of said associated switch means in response to a predetermined enabling input signal to said addressable switch actuating means, whereby a portion of the particular subscriber line and the subscriber station connected to said portion become connected to a selected said trunk line at the matrix crossing point controlled by said selected switching means and become disconnected from the remaining extent of such subscriber line across said matrix, and being operative to disenable all such associated switching means in response to a reset input signal to said addressable switch actuating means, whereby any existing previous said selected trunk line connection is terminated and said subscriber line uninterruptedly crosses said trunk lines without connection thereto.

7. The switching matrix as in claim 6, wherein:
each such subscriber station is a telephone subscriber station;
said pair of conductors which comprises each of said subscriber lines has a first end on said matrix, for connection to a respective such telephone subscriber station, and a second end on said matrix; and
circuit means connected to supply a battery signal to each of said second ends of said pairs of conductors, so that battery signal is supplied through a said pair of conductors to a telephone subscriber station only while the said switching means associated with said pair of conductors connected to said telephone subscriber station are in said disenabled state.

8. The switching matrix as in claim 6, wherein:
each said addressable switch actuating means is selectively operative to enable any of said switching means associated with the corresponding subscriber line in response to an input switching signal received by said addressable means;
said matrix further comprising first circuit means operatively connected to each of said M addressable means in parallel to receive a source of said input switching signals; and
enable circuit means separately controlling each of said addressable switch activating means to enable each individual addressable switch activating means to concurrently enable selected ones of said associated switching means in response to the input switching signals received in parallel by all said addressable switch activating means.

9. The switching matrix as in claim 8, wherein:
said switching means at each said matrix crossing point comprises relay means which is selectively operative to be enabled in response to a switching signal provided by said addressable means associated with the respective said subscriber line; and
each said relay means operates in fast-engage slow-release manner so that the time required for said relay means to release a previously engaged state is greater than the minimum time required for said addressable means to provide said switching signal to said relay means.

10. The switching maxtrix as in claim 6, wherein:
each such subscriber station is a telephone subscriber station; and
each of said subscriber lines comprises a first line pair and a second line pair; and further comprising
pair select means associated with each of said subscriber lines and with a particular telephone subscriber station connected to such subscriber line, each said pair select means being selectably operative to connect such particular telephone subscriber station to either the first or second line pair of said associated subscriber line;

battery circuit means connected to supply a battery signal to said first line pair of each said subscriber line; and ring circuit means connected to supply a ringing signal to said second line pair of each said subscriber line, so that either a battery signal or a ringing signal is selectably supplied to a particular telephone subscriber station by operation of said pair select means associated with that particular subscriber line.

11. The switching matrix as in claim 10, further comprising subscriber status means in circuit with said telephone subscriber line associated with each pair select means to provide an output signal indicating the status of each subscriber line in response to battery current flowing to said subscriber station.

12. The switching matrix as in claim 10, further comprising:

information signal means operative to provide a number of diverse signals;

signal selection means associated with at least some of said trunk lines and connected to receive all of said diverse information signals; and control circuit means associated with each of said signal selection means to supply a selected one of said information signals to a selected one of said trunk lines in response to a predetermined control signal, so that any subscriber station which is interconnected to said selected trunk line through a switching means will receive said selected informational signal.

13. The switching matrix as in claim 10, wherein: each of said trunk lines of said matrix array comprises a first trunk circuit and a second trunk circuit;

said switching means for a selected said subscriber line at each said crossing point of the matrix array being operative, when disenabled to maintain said first and second line pairs of said selected subscriber line disconnected from said trunk lines and connected respectively to said battery circuit means and to said ring circuit means; and being operative, when enabled, to transfer said first line pair of said selected subscriber line from said battery circuit means to said first trunk circuit of a predetermined trunk line and to transfer said second line pair from said ring circuit means to said second trunk circuit of said predetermined trunk line.

14. The switching matrix as in claim 10, further comprising:

means connected to supply a battery signal to each of said trunk lines so that a subscriber station which becomes switched by said switching means from said first line pair circuit to one of said trunk lines continues to receive a battery signal on said trunk line.

15. The switching matrix as in claim 10, wherein: said pair select means for a given subscriber line comprises circuit means operatively associated with a selected one of said switching means for such subscriber line to interconnect said first and second line pairs of such subscriber line in response to a predetermined operation of said switching means, so that a particular subscriber line is supplied either with a battery signal or a ringing signal depending on the operation of said selected switching means for such subscriber line.

* * * * *